(12) United States Patent  
Wilson et al.

(10) Patent No.: US 6,560,681 B1  
(45) Date of Patent: May 6, 2003

(54) SPLIT SPARSE DIRECTORY FOR A DISTRIBUTED SHARED MEMORY MULTIPROCESSOR SYSTEM

(75) Inventors: James Christopher Wilson, Los Gatos, CA (US); Wolf-Dietrich Weber, San Jose, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/281,714

(22) Filed: Mar. 30, 1999

Related U.S. Application Data (60) Provisional application No. 60/084,795, filed on May 8, 1998.

(51) Int. Cl.[7] .............................................. G06F 12/00
(52) U.S. Cl. ........................................ 711/144; 711/146
(58) Field of Search ........................ 711/121, 141–146

(56) References Cited

U.S. PATENT DOCUMENTS

| | | | | |
|---|---|---|---|---|
| 5,680,576 A | * | 10/1997 | Laudon | 711/145 |
| 5,749,095 A | * | 5/1998 | Hagersten | 711/141 |
| 5,822,763 A | * | 10/1998 | Baylor et al. | 711/118 |
| 5,875,468 A | * | 2/1999 | Erlichson et al. | 711/141 |
| 5,890,217 A | * | 3/1999 | Kabemoto et al. | 711/141 |
| 6,253,292 B1 | * | 6/2001 | Jhang et al. | 709/218 |
| 2001/0013089 A1 | * | 8/2001 | Weber | 711/146 |

* cited by examiner

*Primary Examiner*—Matthew Kim  
*Assistant Examiner*—Matthew D. Anderson  
(74) *Attorney, Agent, or Firm*—Carr & Ferrell LLP

(57) ABSTRACT

A split sparse directory for a distributed shared memory multiprocessor system with multiple nodes, each node including a plurality of processors, each processor having an associated cache. The split sparse directory is in a memory subsystem which includes a coherence controller, a temporary state buffer and an external directory. The split sparse directory stores information concerning the cache lines in the node, with the temporary state buffer holding state information about transient cache lines and the external directory holding state information about non-transient cache lines.

22 Claims, 5 Drawing Sheets

Overview of Directory Based Cache Coherence Control

SPLIT SPARSE DIRECTORY FOR A DISTRIBUTED SHARED MEMORY MULTIPROCESSOR SYSTEM

This application claims the benefit of U.S. Provisional Application No. 60/084,795, filed on May 8, 1998.

CROSS-REFERENCE TO CO-PENDING APPLICATIONS

This application is related to U.S. patent application Ser. No. 09/041,568, entitled "Cache Coherence Unit for Interconnecting Multiprocessor Nodes Having Pipelined Snoopy Protocol," filed on Mar. 12, 1998; U.S. Pat. No. 6,212,610, entitled "Memory Protection Mechanism for a Distributed Shared Memory Multiprocessor with Integrated Message Passing Support," issued on Apr. 3, 2001; and U.S. Pat. No. 6,209,064, entitled "Cache Coherence Unit with Integrated Message Passing and Memory Protection for a Distributed, Shared Memory Multiprocessor System," issued on Mar. 27, 2001; which are hereby incorporated by reference.

BACKGROUND OF THE INVENTION

1. Technical Field

This invention relates generally to multiprocessor data processing systems, and more particularly to cache coherence for a plurality of multiprocessors with a multi-bus shared memory system.

2. Discussion of the Background Art

Some computer systems are built with multiple processors that can work in parallel on a program to speed up its execution. The architectures of such multiprocessor systems are classified according to the mechanisms used to communicate between the multiple processors. In shared-memory architectures, all processors access a single large memory and communicate with one another by writing to and reading from this shared memory.

A computer system node may be divided into a processor subsystem and a memory subsystem. The memory subsystem includes the main Dynamic Random Access Memory (DRAM) and provides data from memory in response to requests from any number of connected processors. Normally, the amount of time spent to access data in the memory subsystem is quite long relative to a processor's speed and therefore processors are often built with caches to improve their performance. A cache is a small memory connected between a processor and main memory that stores recently-used data from locations of main memory. The smallest unit of data that can be transferred into and out of a cache is called a "line."

The processor subsystem includes the processors and one or more caches. A cache has a much faster access time than the main memory subsystem, but is usually much smaller. Since a smaller cache cannot hold all of the data that is in the main memory, it must store both the address (called the tag) and the value for any data it currently holds. When a processor requests a particular line, it first attempts to match the address against each of the tags currently in the cache to see whether the line is in the cache. If there is no match, the memory subsystem passes the request to the main memory.

All caching schemes divide main memory into physically consecutive segments. A cache is usually organized as a series of lines totaling the same size as a segment. The tag is used to identify which segment is currently occupying the cache. If the line with a requested address is contained in the cache then the data in that line is delivered to the processor. If the line is not in the cache, then the segment of the main memory containing the line is fetched into the cache and the line is delivered to the processor.

In a direct-mapped cache memory, segments are put into cache lines whose line numbers can easily be calculated from the main memory address.

An associative cache differs from a direct-mapped cache in that a line from any segment may be loaded into any cache line. The cache line needs to store the segment number in addition to the data itself. In order to allow searching the cache, an associative cache includes circuitry to simultaneously check the segment number address against the segment number in every line of the cache. This additional circuitry makes associative caches more expensive.

Set-associative mapping combines architectures of both direct-mapping and associative caches. A set-associative cache is organized as a number of sets, each containing a number of lines. With set-associative mapping, the cache set is determined by the address segment number, but the line within the set is not determined by the address segment number. Typically, set-associative caches are two way, meaning that there are two sets in the cache, which significantly improves the cache hit rate over a direct-mapped cache in providing the requested memory lines.

Figure 1:
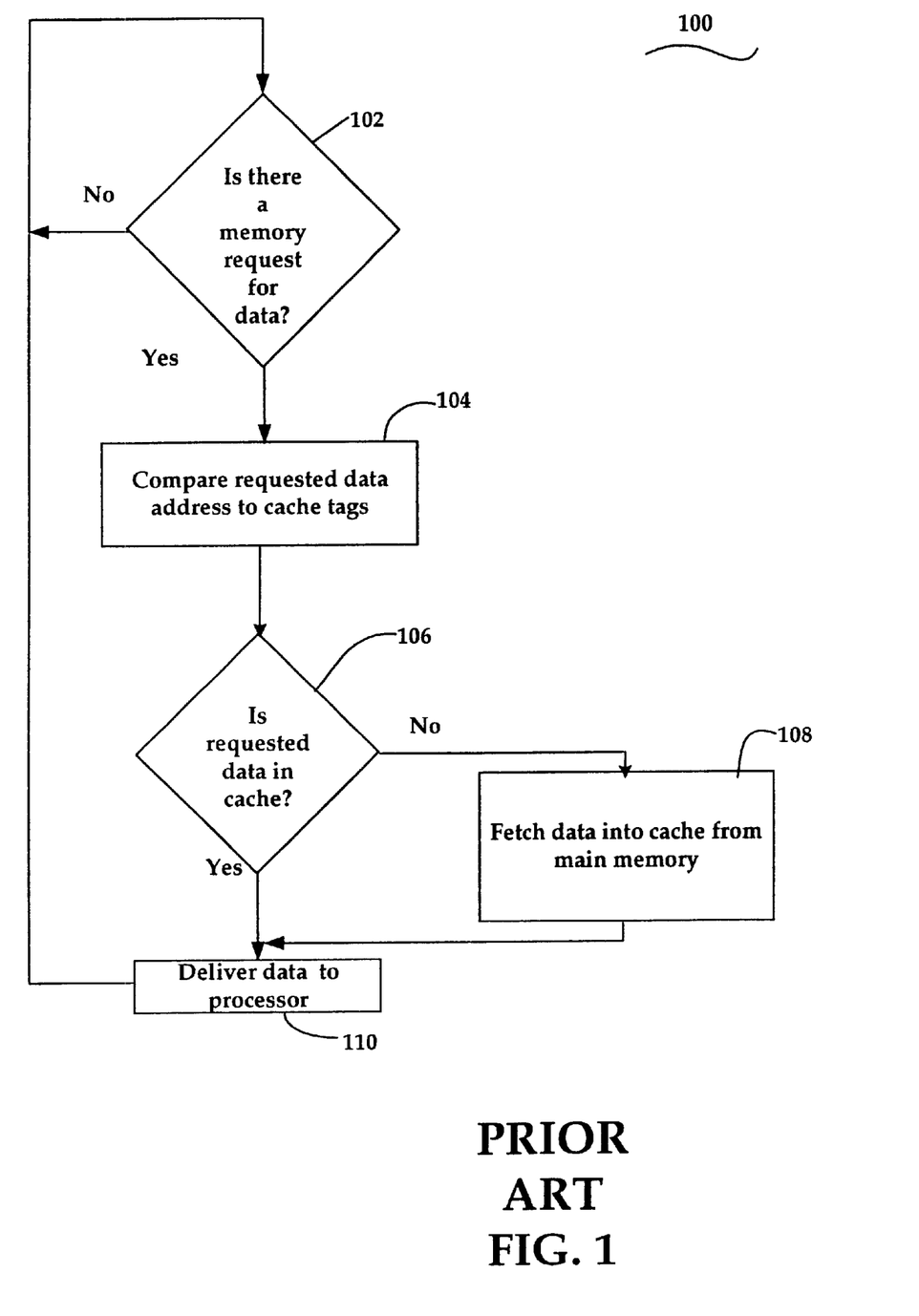
FIG. 1 is a flowchart of a prior art cache memory access algorithm.

FIG. 1 shows a flowchart of a typical prior art cache memory access algorithm 100 starting in step 102 with a new request for data in memory. In step 104 the requested data address is compared to the cache tags. Step 106 determines whether the requested data is in a cache. In step 106, if no valid copy of the data is in a cache, then in step 108 the memory subsystem fetches the requested data from main memory into cache memory. Once the requested data is in a cache, in step 110 the memory subsystem delivers the data to the processor that requested it. After the data is delivered to the processor, the memory access algorithm returns to step 102 to await a next memory request.

In a shared-memory multiprocessor system, each processor typically has its own cache, so the system has multiple caches. Since each cache can hold a copy of a given data item, it is important to keep the states of all the caches consistent and up-to-date with the latest copy written by one of the processors. It is the responsibility of the memory subsystem to return from the caches or main memory the correct value as prescribed by the processor's memory model, which is a set of rules governing the operation of the memory subsystem. This is achieved through the use of a cache coherence protocol.

Therefore, in addition to the main memory, the memory subsystem includes a cache coherence directory which contains control information used by the cache coherence protocol to maintain cache coherence in the system. A conventional directory has an entry for each main memory location with state information indicating whether the memory location data may also exist in a cache somewhere in the system. The node where the main memory line resides is called the home node of that line. The node where the directory resides is called the local node and other nodes are called remote nodes. The coherence protocol keeps track of the state of each cache line and guarantees that the most recent copy of data is given to the processor. The protocol also specifies all transitions and transactions to be taken in response to a request. Any action taken on a cache line is reflected in the state stored in the directory. A common scheme uses three permanent states to accomplish this. The "Invalid" state exists when a line is not cached anywhere and main memory has the only copy. The "Shared" state exists when a remote node (group of processors) has a valid copy of the line. This is not to be confused with a "global shared state," i.e., a global cache coherence state which exists when any cache in the local node or at least one remote cache has a valid copy of the line. These valid lines are read-only and are identical to the copy in main memory. The "Dirty" state exists when a line is valid in one cache only at a remote node. The copy may be modified by that processor and the main memory may contain old data.

Figure 2:
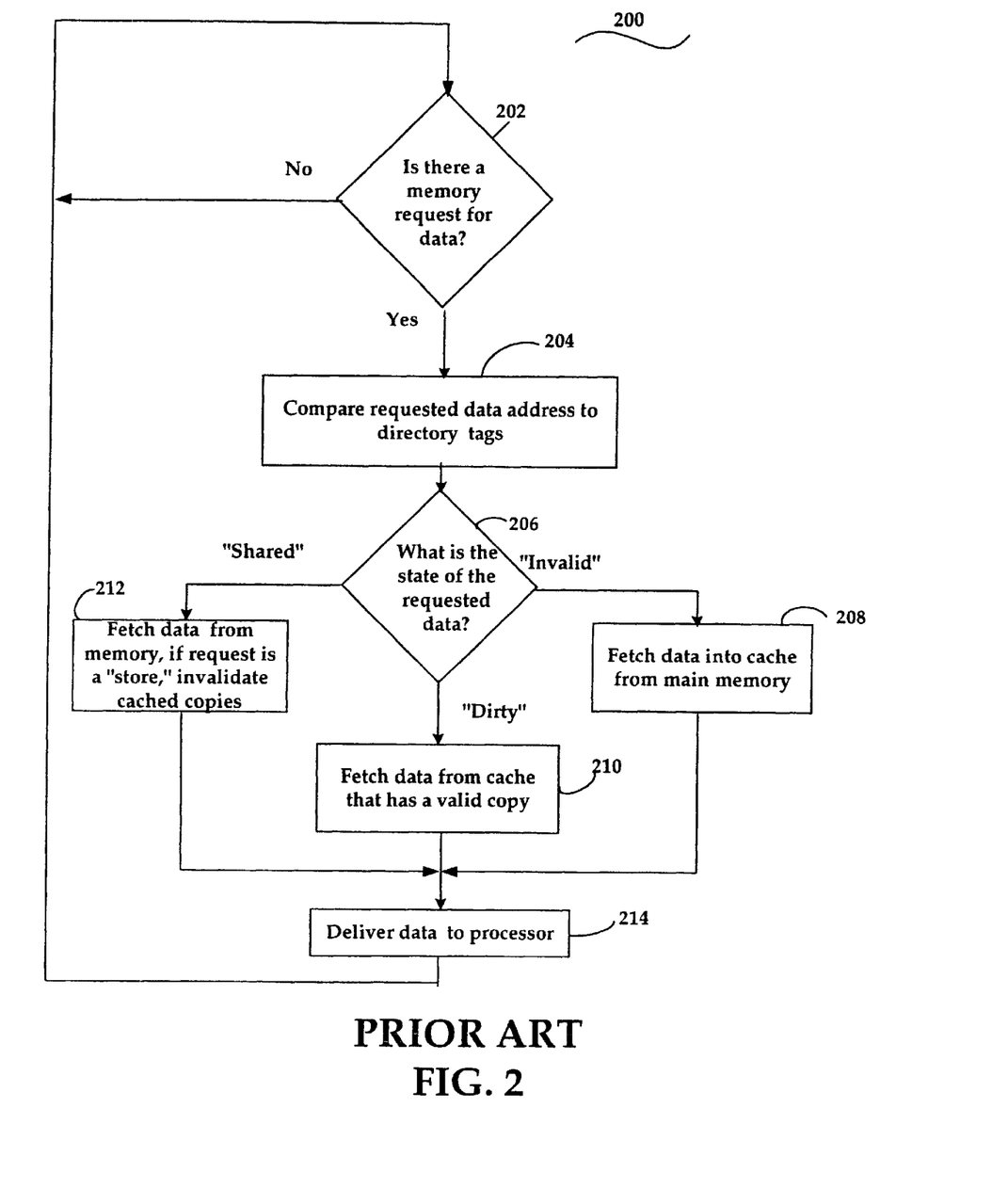
FIG. 2 is a flowchart of a prior art cache memory access algorithm using a cache coherence directory.

FIG. 2 shows a flowchart of a memory access algorithm 200 using a cache coherence directory. A new request for data in memory starts the algorithm in step 202. In step 204 the algorithm compares the requested data address to the directory tags in the cache coherence directory.

In step 206 the algorithm determines the state of the requested data from the cache coherence directory. If in step 206 the state is "Invalid" (i.e., there is no valid copy of the data in a cache), then in step 208 the algorithm fetches the requested data from main memory or local cache into cache memory. If in step 206 the state is "Shared" (i.e., the requested data is in a cache in a remote node), then in step 212 the algorithm fetches the data from memory and if the request is a "store," invalidates the cached copies. If in step 206 the state is "Dirty" (i.e., the most recent version of the data is valid in only one cache), then in step 210 the algorithm fetches the requested data from the cache.

Once a valid copy of the data has been fetched, in step 214 the algorithm delivers the data to the processor that requested it. After the data is delivered to the processor, the memory access algorithm returns to step 202 to await a next memory request.

The coherence protocol may use other transient states to indicate that a line is in transition. Given enough time, these transient states revert to one of the three permanent states.

A cache coherence protocol is typically implemented by a finite state machine in which the states determine where the most recent value of the data resides. A state value must be explicitly or implicitly associated with every line in memory. Typically, explicit association is done by adding some state information to the cache tags in each cache. For lines that are not cached, the state value is implicit in there being no tag match anywhere in the system and thus it is known that the most recent value is in the main memory.

On every processor request, the memory subsystem must look at all cache tags in all caches in the system. There are two methods of doing this: In the first method, sometimes called a "snoopy protocol," each cache can "snoop" every request and then signal to the memory subsystem if it has the most recent copy of the data. In the second method, sometimes called a "directory based cache-coherence protocol," the memory subsystem can keep a copy of each cache's tags to find the location of the most recent copy.

In cache coherent non-uniform memory architecture (cc-NUMA) machines, several memory subsystems are linked together, using a cache coherence protocol to enforce the correct memory model between memory subsystems, to form a single shared memory system. As such a machine is enlarged by the addition of memory subsystems, the bandwidth of the communication paths to memory scales up. Similarly, the cache coherence protocol can be made scalable by making it directory-based. As more memory subsystems are added, so grows the number of directories. The directories may be distributed among the nodes in the system. Each directory tracks the states of all cache lines. The directory size is therefore proportional to the total size of caches and the directory may be organized as a set associative cache of directory entries.

Direct mapping always puts segments in the same place, and thereby avoids the question of which line to replace when the cache is full. However, fully associative and set-associative cache mapping schemes require a replacement protocol to determine which segment in the cache will be replaced by a newly requested segment. The most popular protocol is the "Least Recently Used" (LRU) protocol, which replaces the segment which has not been used for the longest time.

Figure 3:
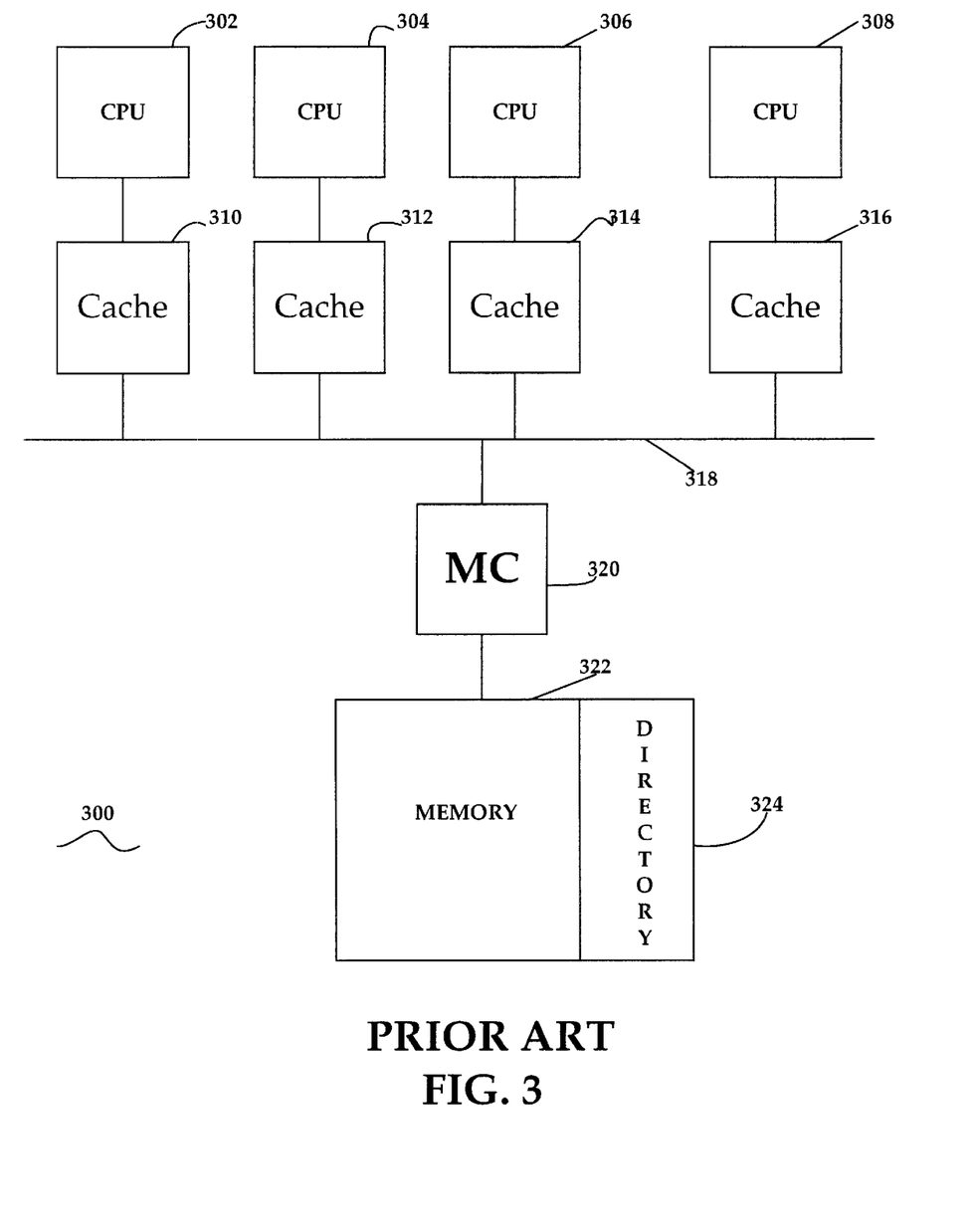
FIG. 3 is a block diagram of a prior art system including multiple CPUs each having its own local cache, connected by a bus to main memory.

FIG. 3 shows a prior art system 300 including multiple CPUs 302, 304, 306, and 308 having respective local caches 310, 312, 314, and 316 connected by a bus 318 to a memory controller 320 for main DRAM memory 322. In this example of a non-sparse directory, main memory 322 has, for each memory line location, space reserved for a directory 324 entry. This wastes memory space because the total number of cached lines, which determines the number of valid directory entries, is usually much smaller than the total number of lines in main memory. This also wastes memory bandwidth because the same memory 322 is used for directory 324 to hold all coherence states, and there is no faster, smaller memory available for a directory dedicated to lines in short-term transient states.

The prior art cache coherence protocols are deficient in that the directory structure does not distinguish between transient and non-transient line states. Normally, there is only a single transition between transient and non-transient states, but there may be multiple transitions between transient states. Thus, multiple state changes occurring when a line is transient requires additional directory bandwidth.

What is needed, therefore, is a cache coherence protocol that provides an optimized directory architecture which can take advantage of the different directory requirements of different coherence states of lines in cache to improve memory subsystem performance.

SUMMARY OF THE INVENTION

The present invention includes multiple multiprocessor nodes each having at least one processor connected to a cache storing multiple cache line entries, a coherence controller, and a directory for keeping track of the cache line states in the caches. The directory includes a first part that holds temporary state information about a first subset of lines for the caches, and the second part that holds non-temporary state information about a second subset of lines for the caches.

The invention reduces the amount of external storage required to hold cache coherence states. Because the amount of time that a line is in a transient state is very short and only a small number of lines will be transient at any given time, the invention also reduces the size of a temporary state buffer. Additionally, the invention, through multiple transient states, eliminates accesses to the external directory for transitions and increases the overall throughput of the coherence protocol.

These and other advantages of the invention will be apparent to those skilled in the art from the following detailed description and the accompanying drawings.

DETAILED DESCRIPTION OF THE INVENTION

The present invention uses cache coherence state information in directory-based cache coherence protocols. The invention thus includes external random access memories (RAM) holding permanent states and an internal buffer holding transient states. The invention is therefore advantageous over prior art systems whose buffers, in addition to cache coherence state information, store both the state and data value. These buffers are usually internal fully associative cache extensions for lines that are transitioning in and out of memory.

The invention also allows many of the state transitions to be done entirely within the internal buffer, and thus reduces the required bandwidth of the external directory and increases overall throughput. Prior art split transaction systems must do a read cycle and a write cycle to the external directory RAM for any state update.

Figure 4:
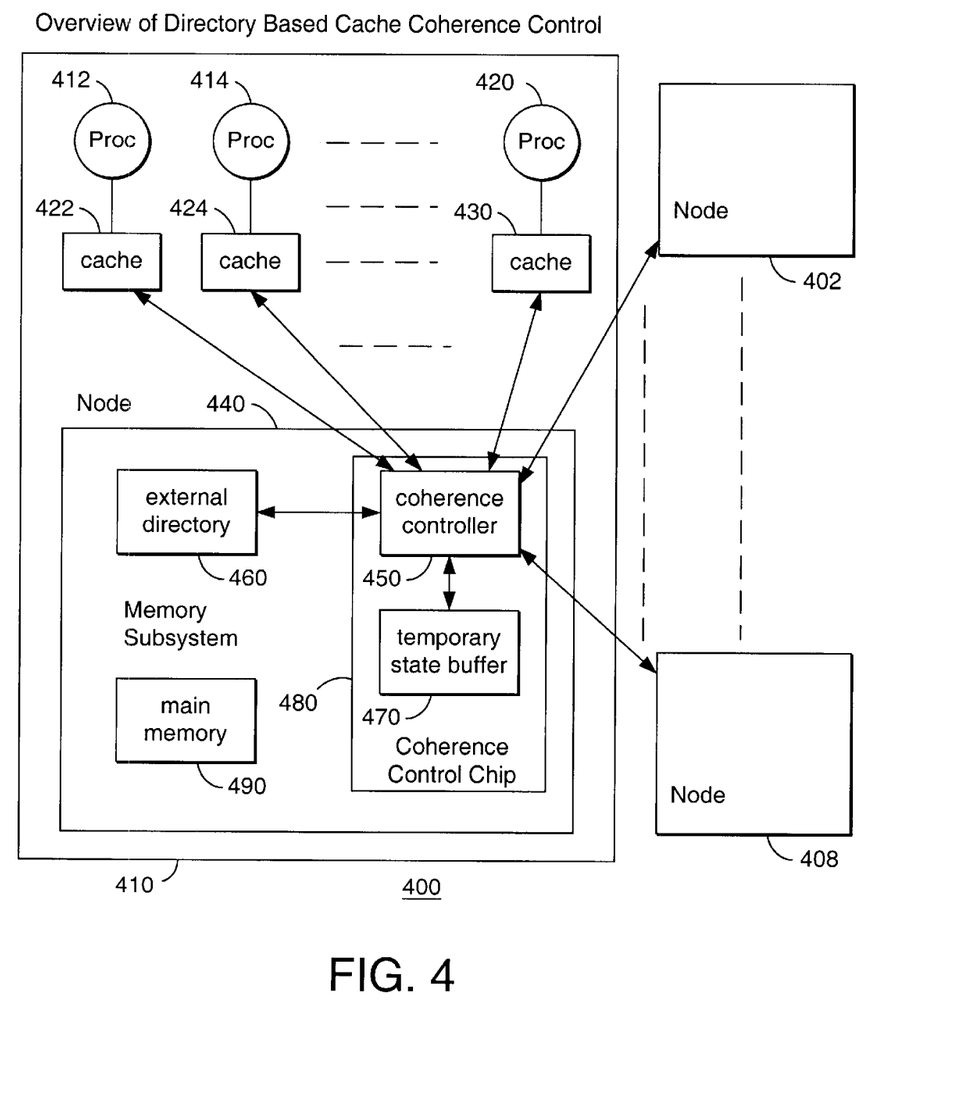
FIG. 4 is a block diagram of a ccNUMA system having a number of interconnected nodes each including a number of processors and caches, a coherence controller, an external directory and a temporary state buffer.

FIG. 4 shows an overview of a ccNUMA system 400 comprising a number of connected nodes 402, ..., 408, and 410. Each node, as shown for node 410, includes some number of processors 412, 414, ..., and 420 having respective caches 422, 424, ..., and 430 connected to a single memory subsystem 440. Memory subsystem 440 includes an external directory 460, main memory 490, and a coherence control chip 480 which contains a coherence controller 450 and a temporary state buffer 470. Coherence controller 450 reads and writes state information contained in an external directory 460 and temporary state buffer 470.

External directory 460 is normally implemented using off-the-shelf RAMs. Only a single "read" or "write" can be performed at one time, although reads and writes can be pipelined, and it usually takes multiple system cycles for a read or write operation to finish. It is usually implemented as a set-associative or direct-mapped cache. If set-associative, then each set comprises multiple entries, each contains a tag, state, and other information used by coherence controller 450. Typically there is also a small amount of other information, such as a "Least Recently Used" (LRU) field, to enable coherence controller 450 to allocate and de-allocate entries. Coherence controller 450 manages external directory 460 by performing basic read and write operations to the RAMs. Since these are off-the-shelf RAMs, their operation is well-known and will not be described here.

Temporary state buffer 470 contains a number of entries, each including a tag, a state, and other information used by coherence controller 450. Operations that can be performed on temporary state buffer 470 are: allocate an entry, de-allocate an entry, and update an entry. In addition, temporary state buffer 470 has an output that indicates to coherence controller 450 that all entries are allocated. These operations can also be done simultaneously on temporary state buffer 470.

Allocation includes finding an unused entry. Unused entries can be indicated either by having an explicit bit in each entry or by setting the state of the entry to "invalid." An unused entry can be selected arbitrarily, one simple way being through the use of a priority encoder (not shown). Allocation is performed by writing the state as a "valid" value and writing all the fields in the entry. Temporary state buffer 470 then returns to coherence controller 450 the number of the entry that was allocated.

De-allocation can be done either by entry or by associative lookup. If done by entry, coherence controller 450 provides the number of the entry to be de-allocated. If done by associative lookup, temporary state buffer 470 compares the address with all tags in the temporary state buffer 470 to determine which entry to de-allocate. De-allocation is done either by setting an explicit bit as "invalid" or by setting the state as the "invalid" state.

Coherence controller 450 can update a valid entry in temporary state buffer 470. It first determines which entry to update either by using an explicit entry number or by using associative lookup. Temporary state buffer 470 then writes any fields, including the state field but not the tag field, specified by coherence controller 450.

Figure 5:
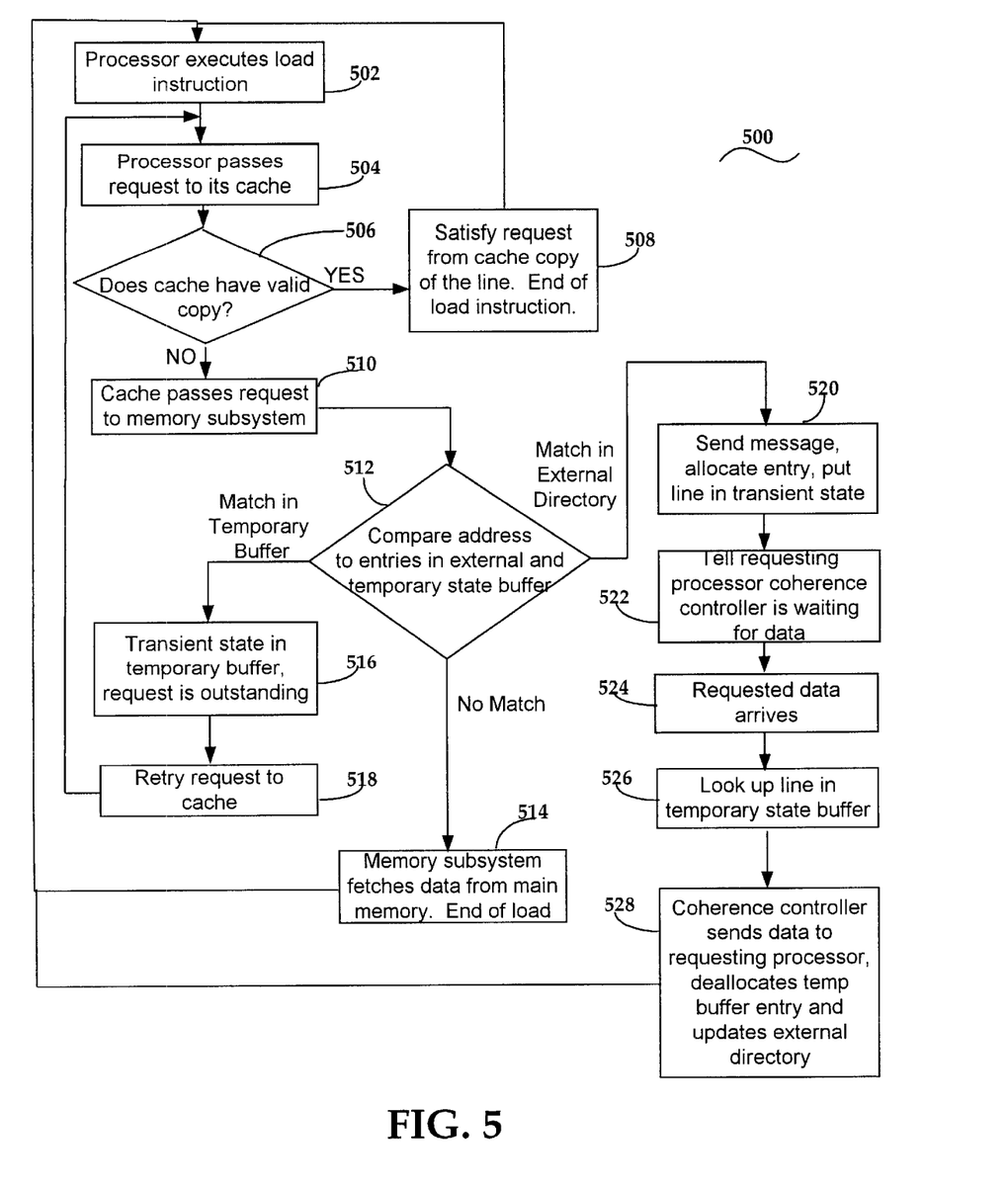
FIG. 5 is a flowchart of a local read operation using the temporary state buffer in the ccNUMA system of FIG. 4.

FIG. 5 is a flowchart of a local read operation 500 using temporary state buffer 470. The algorithm starts in step 502 with processor 412 executing a load instruction with an address that refers to a location in local node 410. In step 504, processor 412 first passes this request to its cache 422, which in step 506 checks whether it has a valid copy of the line. If so, then in step 508 cache 422 provides the line and finishes the load instruction. If not, then in step 510 cache 422 passes the request to memory subsystem 440. In step 512 coherence controller 450 in memory subsystem 440 first compares the address to the entries in both external directory 460 and in temporary state buffer 470 to see if any state information matches the address in these directories. If there is no match, then the most recent value of the data line must be in main memory and accordingly in step 514 memory subsystem 440 fetches the data line from main memory 490 and the load instruction is finished. If in step 512 the algorithm finds a matching address stored in temporary state buffer 470, then in step 516 coherence controller 450 determines that a request is already outstanding for this line. How this is handled depends on the coherence protocol, but one way to handle this situation is shown in step 518, where the algorithm simply instructs processor 412 to retry the request.

If in step 512 the algorithm determines that there is a matching address in external directory 460 indicating that the most recent value exists in some other node, then in step 520 coherence controller 450 sends a message to that node, allocates an entry for this line in temporary state buffer 470 and puts the previously existing line in buffer 470 in a transient state. In step 522 coherence controller 450 completes the current transaction by informing the requesting processor 412 that coherence controller 450 is waiting for the data. Coherence controller 450 is then free to process new requests.

Later, in step 524, the requested data arrives from the remote node and in step 526 coherence controller 450 looks up the line in temporary state buffer 470 to retrieve the transient state. The transient state tells coherence controller 450 where to deliver the data and what the final permanent state should be. In step 528 coherence controller 450 starts a new transaction to send the data to requesting processor 412, de-allocates the temporary state buffer entry, updates external directory 460 to the final permanent state and finishes the load instruction.

The exemplary embodiment described herein is for purposes of illustration and is not intended to be limiting. Therefore, those skilled in the art will recognize that other embodiments could be practiced without departing from the scope and spirit of the claims set forth below.

What is claimed is:

1. A data processing system comprising:
a plurality of multiprocessor nodes each including
a plurality of caches each capable of storing a plurality of cache line entries;
a plurality of processors each connected to a respective cache;
a coherence controller; and
a directory for keeping track of the states of cache line entries in said plurality of caches, wherein a first part of said directory holds temporary state information about a first subset of line entries for said plurality of caches and a second part of said directory holds non-temporary state information about a second subset of line entries for said plurality of caches.

2. A data processing system as in claim 1 wherein said second part of said directory comprises at least one external directory.

3. A data processing system as in claim 1 wherein said first and second parts of said directory are physically separate.

4. A data processing system as in claim 1 wherein a cache coherence protocol within at least one of said plurality of multiprocessor nodes uses a snoopy coherence protocol and a cache coherence protocol across said plurality of multiprocessor nodes uses a directory-based cache coherence protocol.

5. A data processing system as in claim 3 wherein said first part of said directory is an internal on-chip directory and said second part of said directory is an external off-chip directory.

6. A data processing system comprising:
multiple nodes each having a plurality of processors coupled to a memory bus, each processor having a respective cache storing a plurality of cache line entries;
a bus interface element for coupling to said memory bus;
a directory, including a first part for holding temporary state information and a second part for holding non-temporary state information of cache line entries in said caches; and
a coherence controller coupled to said bus interface element and to said directory for reading state information from said directory and updating said state information.

7. A data processing system as in claim 6 wherein said second part of said directory comprises at least one external directory.

8. A data processing system as in claim 6 wherein said first and second parts of said directory are physically separate.

9. A data processing system as in claim 6 wherein a cache coherence protocol within at least one of said multiple nodes uses a snoopy coherence protocol and a cache coherence protocol across said multiple nodes uses a directory-based cache coherence protocol.

10. A data processing system as in claim 8 wherein said first part of said directory is an internal on-chip directory and said second part of said directory is an external off-chip directory.

11. A method for maintaining cache coherence in a data processing system including multiple nodes each having a plurality of processors coupled to a memory bus, each processor having a respective cache memory, comprising the steps of:
storing information about cached memory locations in a directory, wherein a first part of said directory holds transient state information about a first plurality of cache line entries and a second part of said directory holds non-transient state information about a second plurality of cache line entries; and
coupling a coherence controller to said cache memories for maintaining cache coherence.

12. The method of claim 11, wherein said step of coupling comprises the steps of:
reading state information from said directory; and
updating said state information in said directory.

13. The method of claim 11, further comprising the steps of:
using a snoopy coherence protocol within at least one of said multiple nodes; and
using a directory-based cache coherence protocol across said multiple nodes.

14. A method of maintaining cache coherency in a data processing system including a plurality of nodes and an interconnect, each node having
a plurality of multiprocessors with respective caches and memory; and
a directory for storing state information for a plurality of cached memory lines, wherein a first part of said directory holds transient state information about said plurality of cached memory lines and a second part of said directory holds non-transient state information about said plurality of cached memory lines, comprising the step of:
receiving from a memory bus a bus request for the control of one of said cached memory lines.

15. The method of claim 14, further comprising the steps of:
using a snoopy coherence protocol within at least one of said plurality of nodes; and
using a directory-based cache coherence protocol across said plurality of nodes.

16. The method of claim 14, further comprising the steps of:
reading state information from said directory; and
updating said state information in said directory.

17. A data processing system including a plurality of nodes and an interconnect, each node having a plurality of multiprocessors with respective caches and memory, and a directory for storing state information for a plurality of cached memory lines, wherein one part of said directory holds transient state information about a first subset of said plurality of cached memory lines and a second part of said directory holds non-transient state information about a second subset of said plurality of cached memory lines, said data processing system also comprising: a control unit coupled to a memory bus for receiving memory bus requests.

18. A data processing system as in claim 17 wherein said second part of said directory comprises at least one external directory.

19. A data processing system as in claim 17 wherein said first and second parts of said directory are physically separate.

20. A data processing system as in claim 17 wherein said first part of said directory is an internal on-chip directory and said second part of said directory is an external off-chip directory.

21. A data processing system as in claim 17 wherein a cache coherence protocol within at least one of said plurality of nodes uses a snoopy coherence protocol and a cache coherence protocol across said plurality of nodes uses a directory-based cache coherence protocol.

22. The data processing system of claim 17, further comprising:

means for reading said state information of said cached memory lines; and     means for updating said state information for said cached memory lines.

\* \* \* \* \*